United States Patent
Isacks

(10) Patent No.: US 7,697,513 B1
(45) Date of Patent: Apr. 13, 2010

(54) PRIVATE BRANCH EXCHANGE (PBX) NETWORKING OVER IP NETWORKS

(75) Inventor: Kevin Isacks, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 1292 days.

(21) Appl. No.: 11/192,810

(22) Filed: Jul. 29, 2005

Related U.S. Application Data

(60) Provisional application No. 60/615,141, filed on Sep. 30, 2004.

(51) Int. Cl.
*H04L 12/66* (2006.01)

(52) U.S. Cl. ............. 370/356; 370/230; 370/349; 370/352; 379/166; 455/450; 709/227

(58) Field of Classification Search ............ 370/230, 370/349, 352, 356; 379/164, 219–241, 166; 455/450; 709/227
See application file for complete search history.

(56) References Cited

U.S. PATENT DOCUMENTS

| | | | | |
|---|---|---|---|---|
| 5,818,921 | A * | 10/1998 | Vander Meiden et al. ... | 379/225 |
| 6,252,952 | B1 * | 6/2001 | Kung et al. ............. | 379/114.1 |
| 6,307,837 | B1 * | 10/2001 | Ichikawa et al. ............ | 370/230 |
| 6,665,293 | B2 * | 12/2003 | Thornton et al. ............ | 370/352 |
| 6,795,395 | B1 * | 9/2004 | Khasnabish ................. | 370/230 |
| 6,954,455 | B1 * | 10/2005 | Al Hakim et al. ........... | 370/352 |
| 7,068,640 | B2 * | 6/2006 | Kakemizu et al. ........... | 370/349 |
| 7,280,530 | B2 * | 10/2007 | Chang et al. ................ | 370/352 |
| 7,454,505 | B2 * | 11/2008 | Kellner et al. ............... | 709/227 |
| 2002/0186688 | A1 * | 12/2002 | Inoue et al. ................. | 370/352 |
| 2004/0002339 | A1 * | 1/2004 | O'Connor ................... | 455/450 |
| 2004/0066923 | A1 * | 4/2004 | Robinson .................... | 379/166 |

* cited by examiner

*Primary Examiner*—Gerald Gauthier
(74) *Attorney, Agent, or Firm*—Townsend and Townsend and Crew

(57) ABSTRACT

A method for sending messages between a first PBX device and a second PBX device is provided. The method includes receiving a first message from the first PBX at a first gateway. The message includes a standard section and a proprietary section. The standard and proprietary sections may be provided in a protocol associated with the PBX system. The standard section is decoded but the proprietary section is not. The standard section and proprietary section are then packetized in one or more packets. These packets are then sent over a packet-based network to a second gateway and may be routed over the packet-based network using the decoded standard section. The second gateway is then configured to generate a second message including the standard section and the proprietary section for sending to the second proprietary PBX device.

22 Claims, 3 Drawing Sheets

PRIVATE BRANCH EXCHANGE (PBX) NETWORKING OVER IP NETWORKS

CROSS-REFERENCES TO RELATED APPLICATIONS

This application claims priority from co-pending U.S. Provisional Patent Application No. 60/615,141, filed Sep. 30, 2004, entitled "PBX NETWORKING OVER IP", which is hereby incorporated by reference, as if set forth in full in this document, for all purposes.

BACKGROUND OF THE INVENTION

The present invention generally relates to telecommunications and more specifically to techniques for sending proprietary messages from a private Branch Exchange (PBX) over a packet-based network.

A private Branch Exchange (PBX) is a telephone system within an enterprise that switches calls between enterprise users on local lines while allowing all users to share a certain number of external phone lines. The PBX is owned and operated by the enterprise rather than a telephone company. PBX systems typically use a proprietary protocol to send signaling through local lines of a trunk. A trunk may include T1 and E1 lines.

Signaling using the proprietary protocol allows enhanced features to be carried in the PBX system. For example, four-digit calling, call transfer, call park, call pickup, displaying a caller name, and other supplemental features are sent over the PBX system as if it was in one office. Accordingly, remote offices, such as offices in different cities, may be connected as if they were one office. Advanced features are provided using the proprietary signaling; however, users are limited to using the PBX system with dedicated T1/E1 lines in order to use these features.

The proprietary protocol is typically a closed protocol that is only known by the manufacturer of the PBX system. Because outside telephone companies do not support carrying signaling for the PBX system over their networks, a dedicated circuit, such as a T1 or E1 line is used in the PBX system. These lines are typically very expensive. Also, full bandwidth is used regardless of whether a call is being switched on the lines. This is because the lines are dedicated to the enterprise and bandwidth is not allocated on demand.

Because of the closed nature of the proprietary protocol, outside devices cannot decode the proprietary signaling. If a system wants to send the call over a packet-based network (e.g., an IP network), the standard protocols, such as session initiation protocol (SIP), H.323, etc., do not support sending any proprietary information. These protocols only support sending standard information as defined by that protocol. Accordingly, the proprietary signaling that is sent in the PBX system cannot be sent using these packet-based/IP protocols. Thus, users are limited to using dedicated T1/E1 lines in order to transport information in the PBX system.

There is a solution called pseudo wire emulation (PWE) that allows T1/E1 lines to be carried on an IP network. However, this approach suffers from many problems. For example, the PWE approach transports all channels and even when only some of the voice channels are ideal. Also, PWE transports all voice channels in a much longer delay than a T1 and E1 line, which degrades the voice quality because no echo cancellation is provided by the PWE. PWE does not allow signaling using the proprietary protocol to be considered over the packet-based network. Rather, PWE is a point-to-point connection that does not switch or route the calls. The calls are transferred from a designated point to another designated point.

Accordingly, it is desirable to provide techniques for sending proprietary PBX signaling over a packet-based network.

BRIEF SUMMARY OF THE INVENTION

Embodiments of the present invention generally relate to providing PBX networking over a packet-based network.

In one embodiment, a method for sending messages between a first PBX device and a second PBX device is provided. The method includes receiving a first message from the first PBX at a first gateway. The message includes a standard section and a proprietary section. The standard and proprietary sections may be provided in a protocol associated with the PBX system. The standard section is decoded but the proprietary section is not. The standard section and proprietary section are then packetized in one or more packets. These packets are then sent over a packet-based network to a second gateway and may be routed over the packet-based network using the decoded standard section. The second gateway is then configured to generate a second message including the standard section and the proprietary section for sending to the second proprietary PBX device. Accordingly, a proprietary section from a PBX protocol may be sent over a packet-based network.

In one embodiment, a method for sending messages between a first PBX and a second PBX is provided. The method comprises: receiving a first message from the first PBX at a first gateway, the message comprising a standard section and a proprietary section; decoding the standard section; packetizing the standard section and the proprietary section in one or more packets; and sending, over a packet-based network, the one or more packets to a second gateway using the decoded standard section, the second gateway configured to generate a second message including the standard section and the proprietary section for sending to the second PBX.

In another embodiment, a system for sending messages including a proprietary section across a packet based network is provided. The system comprises: a first gateway configured to receive a message from a first PBX, the message comprising a standard section and a proprietary section, wherein the gateway is configured to: decode the standard section in order determine a routing decision for the first message; and packetize the standard section and the proprietary section in one or more packets for sending over a packet-based network based on the routing decision; a second gateway configured to receive, over the packet-based network, the one or more packets from the first gateway, wherein the second gateway is configured to generate send the standard section and the proprietary section to a second PBX.

In yet another embodiment, a gateway configured to send messages between a first PBX and a second PBX is provided. The gateway comprises: logic configured to receive a first message from the first PBX at a first gateway, the message comprising a standard section and a proprietary section; logic configured to decode the standard section; logic configured to packetize the standard section and the proprietary section in one or more packets; and logic configured to send, over a packet-based network, the one or more packets to a second gateway using the decoded standard section, the second gateway configured to generate a second message including the standard section and the proprietary section for sending to the second PBX.

A further understanding of the nature and the advantages of the inventions disclosed herein may be realized by reference of the remaining portions of the specification and the attached drawings.

DETAILED DESCRIPTION OF THE INVENTION

Figure 1:
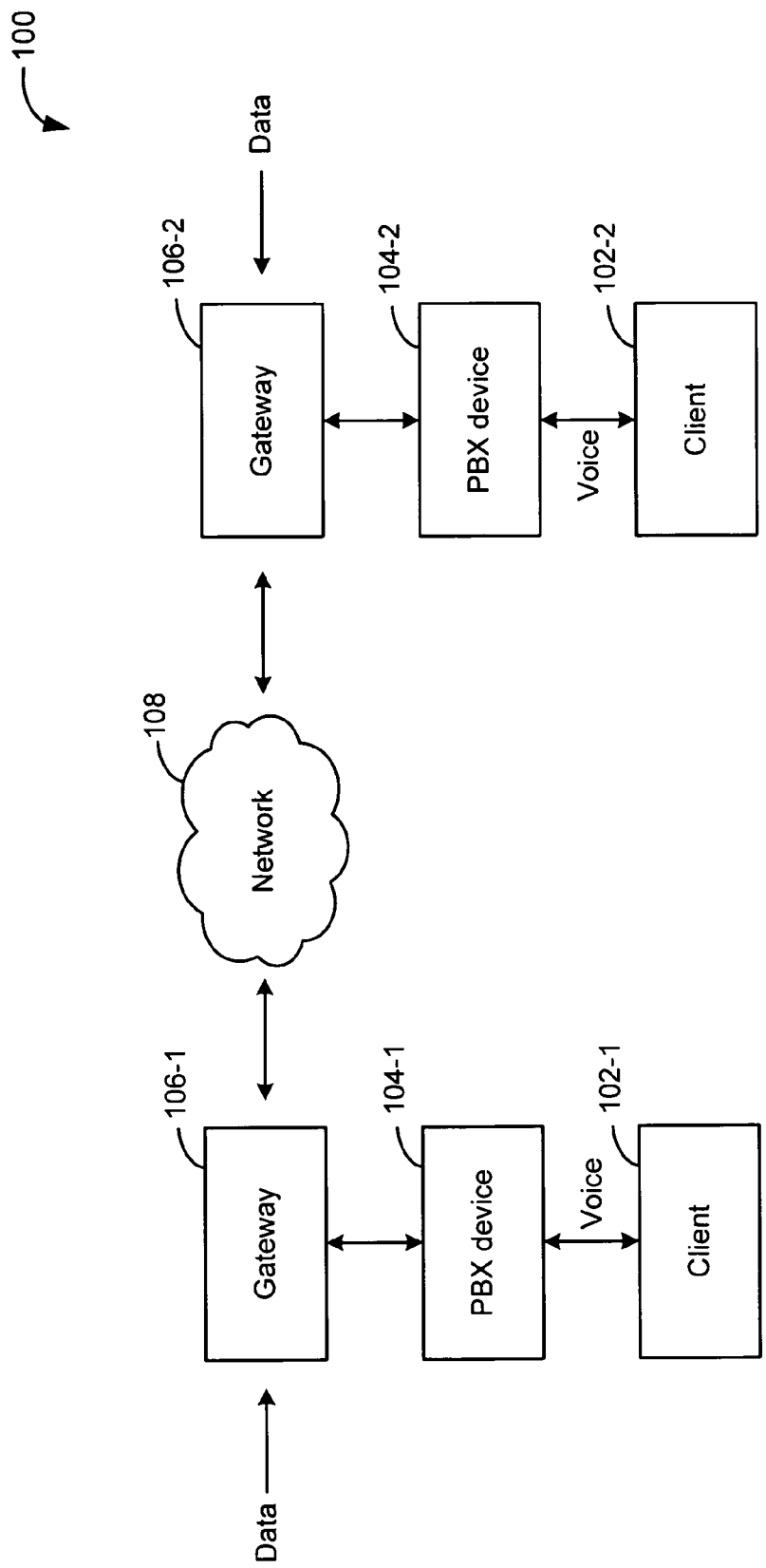
FIG. 1 depicts a system for sending messages in the PBX system according to one embodiment of the present invention.

FIG. 1 depicts a system 100 for sending messages in a PBX system according to one embodiment of the present invention. As shown, clients 102, PBX devices 104, gateways 106, and a network 108 are provided in system 100. Although these components are shown, it will be recognized that a person skilled in the art will appreciate other standard components that may be included in system 100. Further, any number of components shown in system 100 may be provided. The flow of information will be described from client 102-1 to client 102-2 in a single direction; however, it will be recognized that system 100 may be full duplex in nature.

Client 102 may be any device that is used to send information through system 100. For example, client 102 may be a landline telephone, cellular telephone, instant messaging client, VOIP telephone, computer, client installed on a computer, etc. In one embodiment, client 102 is used to send voice data through system 100.

PBX device 104 is a private branch exchange (PBX) device that is configured to send information received from client 102. In one embodiment, PBX device 104 uses a proprietary signaling protocol in order to send certain information through system 100. For example, the proprietary protocol may allow enhanced features, such as 4-digit dialing, call transfer, call park, call pickup, caller name, and other supplemental features. Using PBX devices 104, it is possible that clients 102 located in different locations, such as different geographic offices, can operate as if they are in one office. For example, the extension of a person in a different office may just be dialed in order to connect to that person using PBX devices 104 instead of the whole telephone number.

PBX device 104 uses a proprietary protocol to send voice data received from client 102. When sending the voice data, typically a standard portion and a proprietary portion is included in data sent from PBX device 104. For example, the standard section may be signaling that is used to send information over a T1/E1 line. In one embodiment, the standard section may include signaling in an integrated service digital network (ISDN) standard. The proprietary section is proprietary signaling that is used by the manufacturer of PBX device 104. For example, Comet is used by Siemens as their proprietary protocol for sending information using any PBX device 104.

Gateway 106 is configured to receive a message including data (e.g., voice data) from PBX device 104 and then send the message through a packet-based network 108. In one embodiment, gateway 106 decodes the standard section of the message sent from PBX device 104 and uses it to route the message to a PBX device 104-2 and subsequent client 102-2. For example, the standard information may indicate that a call should go to a certain PBX device and a user at a certain extension. Gateway 106-1 decodes the standard information and uses the decoded information to route or switch the call. Additionally, the standard section may be used to perform other actions, such as bring the circuit used to transport the call in service. Accordingly, intelligent switching can be performed by gateway 106.

Gateway 106-1 is then configured to packetize the message received from PBX device 104-1. In one embodiment, the decoded standard section and the proprietary section are packetized in one or more packets. Accordingly, the proprietary section is not decoded but added to a packet for tunneling to a second gateway 106-2.

The tunneling of the proprietary section in the packet is enabled by using a protocol that allows extensions to the protocol when sending packets over a packet-based network 108. This is different from using some standard protocols, such as SIP or H.323, that are used to send the packets over a packet-based network. In these protocols, non-standard information is not supported; thus, extensions are not allowed to transfer the non-standard PBX messages. Accordingly, a protocol is provided that allows non-standard information for the protocol to be included in a packet.

The packets are then sent through network 108 and received at gateway 106-2. The packets may be switched using information found in the decoded standard section. Gateway 106-2 is then configured to determine where to send information included in the one or more packets using the decoded standard section. Gateway 106-2 then generates a message with the standard section and proprietary section. This message may be similar to the message outputted by PBX device 104-1. The standard section and proprietary section are then sent to the appropriate PBX device 104-2.

PBX device 104-2 then processes the standard section and proprietary section as it would if the PBX devices 104-1 and 104-2 were connected through a dedicated line, such as a T1/E1 line. In one embodiment, the voice data in the message is then sent to client 102-2, with any enhanced features according to the proprietary section being performed.

Figure 2:
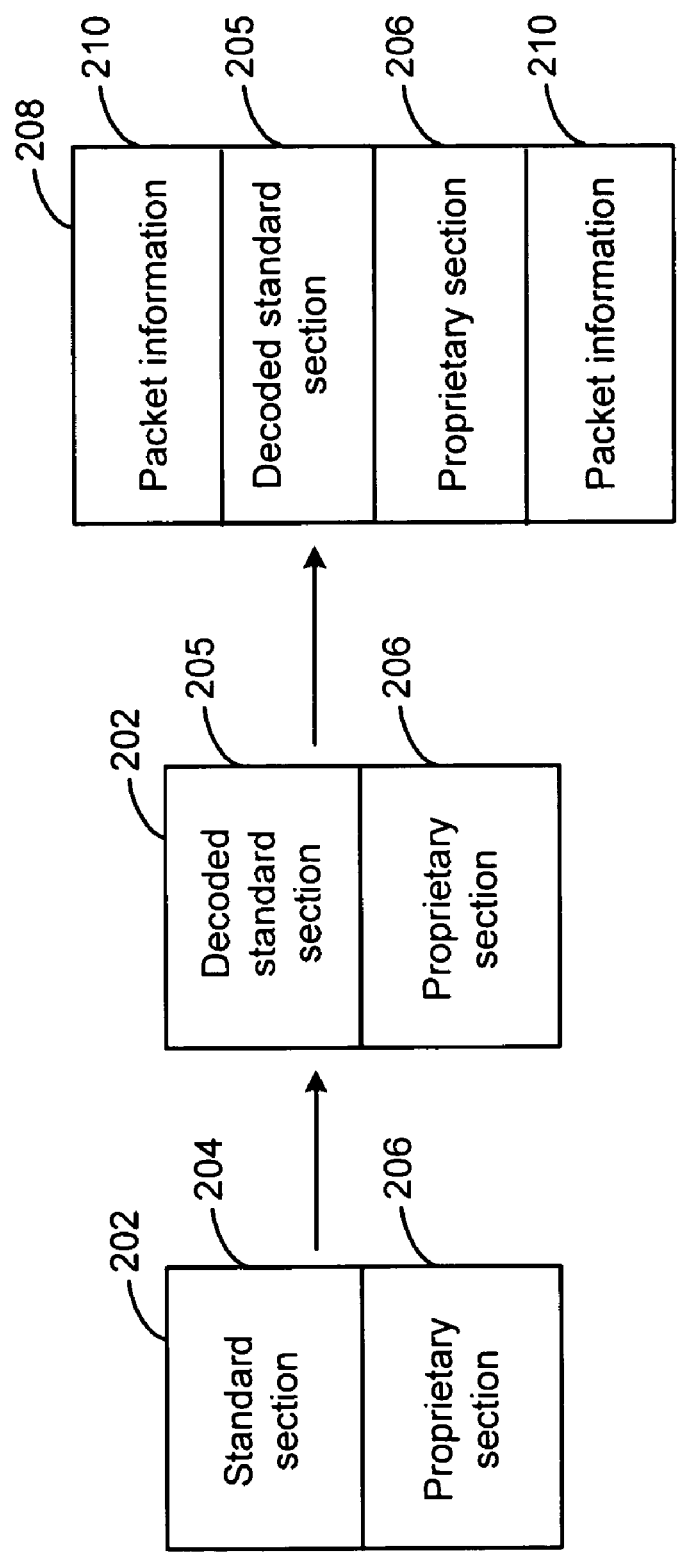
FIG. 2 depicts transformation of a message sent from a PBX device and packetized into a packet according to one embodiment of the present invention.

FIG. 2 depicts the transformation of a message 202 sent from PBX device 104 that is packetized into a packet 208 according to one embodiment of the present invention. As shown, a message 202 includes a standard section 204 and a proprietary section 206.

Standard section 204 may include any information that is known or standardized. For example, standard section 204 may include ISDN signaling information as defined by the ISDN protocol. Standard section 204 may include information used in order to set up a call, such as information for information elements such as clients 102, routers, etc. This information is provided in a standard format.

Proprietary section 206 includes any proprietary information that cannot be decoded by gateway 106 or other devices that are not associated with the owner of PBX device 104-1. For example, proprietary section 206 includes any proprietary signaling used to send information from client 102. In one embodiment, the proprietary signaling may be from the Siemens Comet protocol. The proprietary information may include a calling name, calling number, etc. Additionally, the proprietary information allows enhanced features to be provided, such as lighting a voicemail light, transferring a call, 4-digit calling, call transfer, call park, call pickup, displaying a caller name, and other supplemental features.

When message 202 is received at gateway 106, standard section 204 is decoded into a decoded standard section 205. For example, standard section 204 may be binary information. The binary information may be decoded to determine elements needed to route the call. The decoded standard section is then used to route message 202.

Message 202 may then be packetized into a packet 208. Decoded standard section 205 and proprietary section 206 are included in the packet 208 with any information necessary to route the packet through packet-based network 108. For example, headers, trailers, etc. may be included in packet 208. A person skilled in the art will recognize information that may be included in packet information 210. Basically, packet 208 is configured such that it is routed to a gateway 106-2. In one embodiment, gateway 106-2 is selected based on decoded information in decoded standard section 205. For example, if the calls are supposed to be routed to a specific client 102-2, an appropriate gateway 106-2 that can deliver a call to a PBX device 104-2 associated with client 102-2 is selected.

Accordingly, proprietary section 206 is included as is without any decoding in a packet 208. The protocol used to send packet 208 allows non-standard information to be added to a packet 208. Accordingly, proprietary section 206 may be added to a packet 208 and sent using the protocol.

Figure 3:
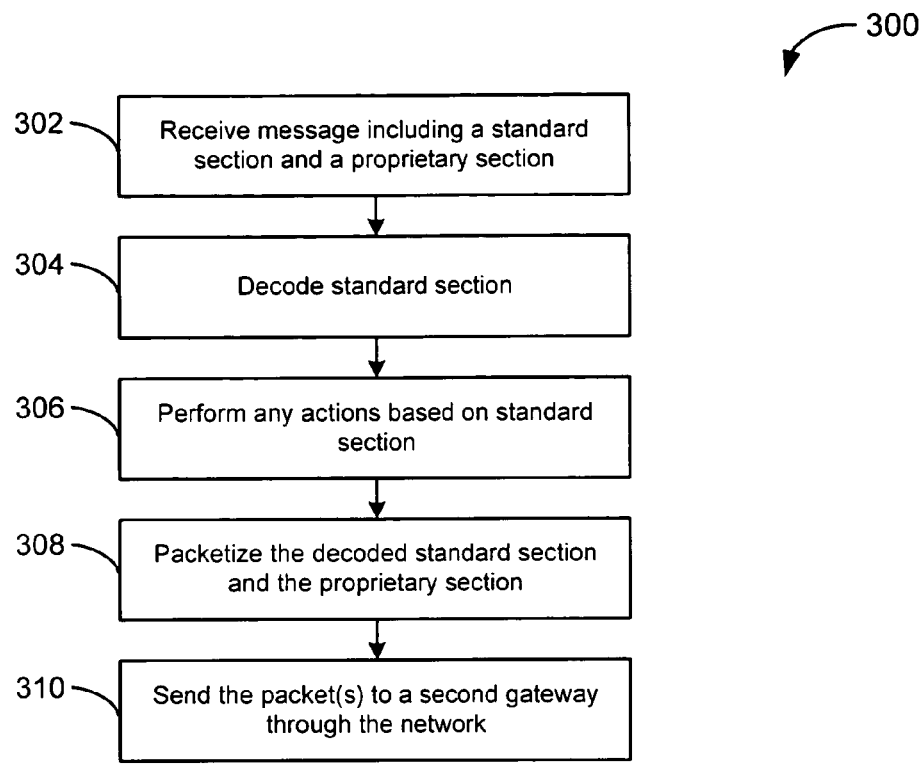
FIG. 3 depicts a simplified flowchart of a method for processing PBX messages according to one embodiment of the present invention.

FIG. 3 depicts a simplified flowchart 300 of a method for processing PBX messages according to one embodiment of the present invention. In step 302, a message is sent that includes a standard section 204 and a proprietary section 206. In one embodiment, the message received is an ISDN message from a proprietary PBX device 104.

In step 304, a standard section 204 is decoded into a decoded standard section 205. Standard section 204 can be decoded because the standard is generally known.

In step 306, any actions are performed based on information in decoded standard section 205. Any actions that can be performed include routing the message. For example, the correct PBX device 104-2 or client 102-2 may be chosen, the called and calling number can be manipulated, and the numbering plans and types of the call can be changed. The choice of the destination, such as PBX device 104-2 or client 102-2, allows a mesh system to be built. No central location or point-to-point connection is required as is in a Pseudo wire emulation (PWE) configuration.

Decoded standard section 205 and proprietary section 206 are then packetized in step 308. In one embodiment, a protocol that allows non-standard extensions to packets sent across packet-based network 108 is used in order to transmit a packet 208 that includes decoded standard section 205 and proprietary section 206.

In step 310, the packets 208 are sent to second gateway 106-2 through a packet-based network 108.

Figure 4:
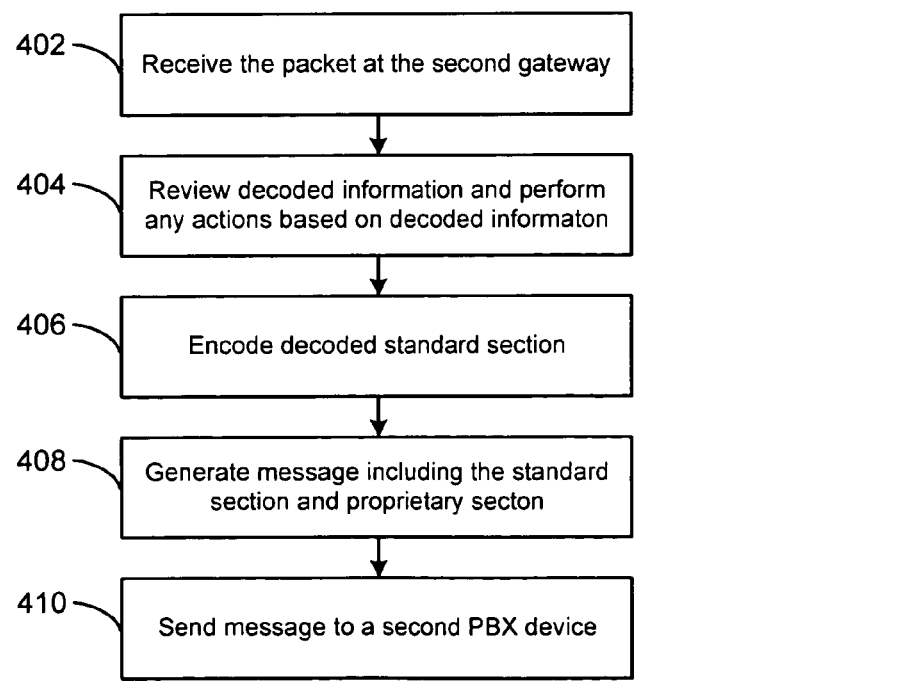
FIG. 4 depicts a simplified flowchart of a method for processing a packet that is received from a first gateway at a second gateway according to one embodiment of the present invention.

FIG. 4 depicts a simplified flowchart 400 of a method for processing a packet 208 that is received from a first gateway 106-1 at a second gateway 106-2 according to one embodiment of the present invention. In step 402, packet 208 is received at second gateway 106-2 through packet-based network 108.

In step 404, the decoded information in decoded standard section 205 is reviewed and any actions are performed based on the decoded information. For example, routing decisions can be made based on the decoded information and number translation can be done on the decoded information. The routing decisions may be to determine which PBX device 104-2 or client 102-2 the call should be routed to.

In step 406, the decoded standard section 205 is re-encoded. For example, decoded standard section 205 may be re-encoded into the ISDN format and is used by PBX device 104.

In step 408, a message including standard section 204 and proprietary section 206 is generated in the protocol used by PBX device 104-2. For example, an ISDN message may be generated using standard section 205 and proprietary section 206.

In step 410, the message is sent to a second PBX device 104-2. PBX device 104-2 can then send the message to client 102-2. Accordingly, PBX devices 104 can operate as if they were connected through a dedicated line, such as a T1/E1 line. Although messages are sent using a proprietary protocol, the proprietary section is tunneled in packets 208 sent across packet-based network 108.

Embodiments of the present invention provide many advantages. For example, proprietary PBX systems may be used in an enterprise where enhanced calling features are provided. Instead of using a dedicated line, which is expensive, a packet-based transport may be used to transport PBX messages. Using the packet-based transport provides many advantages. For example, voice data may be sent through a packet-based network 108. Further, bandwidth limitations are avoided in that bandwidth is used only when voice data is being sent. The bandwidth used may also be on demand, which may be more cost efficient than having dedicated T1 or E1 lines.

Further, voice data may be characterized such that an enterprise can decide if voice or data should be transmitted based on various rules. Packet-based bandwidth is also very cheap. Accordingly, the enhanced features of a PBX system are provided with the advantage of using a packet-based network.

The present invention can be implemented in the form of control logic in software or hardware or a combination of both. In one embodiment, the control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for sending messages between a first PBX and a second PBX over an IP network, the method comprising:
receiving a first message from the first PBX at a first gateway, the first message comprising a standard section and a proprietary section;
decoding the standard section of the first message to obtain routing information;
packetizing the standard section and the proprietary section in one or more packets; and
sending the one or more packets over the IP network to a second gateway based on the routing information, wherein the second gateway is configured to generate a second message including the standard section and the proprietary section for sending to the second PBX.

2. The method of claim 1, wherein the proprietary section comprises information the first gateway cannot decode.

3. The method of claim 1, wherein the first gateway and the second gateway communicate in a protocol that allows an extension to the protocol including the proprietary information to be included in the packet.

4. The method of claim 1, wherein the proprietary information allows a client to perform enhanced functions based on information in the proprietary section.

5. The method of claim 4, wherein the enhanced functions comprise displaying a caller name, displaying a caller number, performing pick up actions, performing park actions, displaying a voicemail light, or displaying a message waiting light.

6. The method of claim 1, wherein the first message and the second message comprise an ISDN message.

7. The method of claim 1, wherein the first message and the second message are substantially similar.

8. The method of claim 1, wherein the standard section is used to determine how to send the first message.

9. A system for sending messages including a proprietary section over an IP network, the system comprising:
   a first gateway configured to receive a message from a first PBX, the message comprising a standard section and a proprietary section, wherein the gateway is configured to:
      decode the standard section of the message received from the first PBX to obtain routing information; and
      packetize the standard section and the proprietary section in one or more packets; and
   send over the IP network the one or more packets based on the routing information;
   a second gateway configured to receive, over the IP network, the one or more packets from the first gateway, wherein the second gateway is configured to generate and send the standard section and the proprietary section to a second PBX.

10. The system of claim 9, wherein:
   the first PBX is configured to generate and send the message including the proprietary section; and
   the second PBX is configured to decode and receive the message including the proprietary section.

11. The system of claim 9, further comprising:
   a first client coupled to the first PBX, the first client configured to send voice data to the first PBX, the voice data included in the message; and
   a second client coupled to the second PBX, the second client configured to receive voice data included in the message and sent over the packet-based network.

12. The system of claim 9, wherein the proprietary section comprises information the first gateway cannot decode.

13. The system of claim 9, wherein the first gateway and the second gateway communicate in a protocol that allows an extension to the protocol including the proprietary information to be included in the packet.

14. The system of claim 9, wherein the proprietary information allows a client to perform enhanced functions based on information in the proprietary section.

15. The system of claim 14, wherein the enhanced functions comprise displaying a name, displaying a number, performing pick up actions, performing park actions, displaying a voicemail light, or displaying a message waiting light.

16. A gateway configured to send messages between a first PBX and a second PBX over an IP network, the gateway comprising:
   logic configured to receive a first message from the first PBX at a first gateway, the message comprising a standard section and a proprietary section;
   logic configured to decode the standard section of the message received from the first PBX;
   logic configured to packetize the standard section and the proprietary section in one or more packets; and
   logic configured to send the one or more packets over the IP network to a second gateway using the decoded standard section, the second gateway configured to generate a second message including the standard section and the proprietary section for sending to the second PBX.

17. The gateway of claim 16, wherein the proprietary section comprises information the first gateway cannot decode.

18. The gateway of claim 16, wherein the first gateway and the second gateway communicate in a protocol that allows an extension to the protocol including the proprietary information to be included in the packet.

19. The gateway of claim 16, wherein the proprietary information allows a client to perform enhanced functions based on information in the proprietary section.

20. The gateway of claim 19, wherein the enhanced functions comprise displaying a name, displaying a number, performing pick up actions, performing park actions, displaying a voicemail light, or displaying a message waiting light.

21. The gateway of claim 16, wherein the first message and the second message comprise an ISDN message.

22. The gateway of claim 16, wherein the first message and the second message are substantially similar.

* * * * *